(12) United States Patent
Russell, II et al.

(10) Patent No.: US 8,050,377 B2
(45) Date of Patent: Nov. 1, 2011

(54) IRRADIATION TARGET RETENTION SYSTEMS, FUEL ASSEMBLIES HAVING THE SAME, AND METHODS OF USING THE SAME

(75) Inventors: William Earl Russell, II, Wilmington, NC (US); David Grey-Smith, Leland, NC (US); Michael S. DeFilippis, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 0 days.

(21) Appl. No.: 12/149,408

(22) Filed: May 1, 2008

(65) Prior Publication Data

US 2009/0274260 A1 Nov. 5, 2009

(51) Int. Cl.
*G21G 1/00* (2006.01)
*G21G 1/12* (2006.01)
*G21G 1/06* (2006.01)
*G21G 1/10* (2006.01)
*G21C 3/00* (2006.01)
*G21C 3/30* (2006.01)

(52) U.S. Cl. ........ 376/202; 376/156; 376/157; 376/158; 376/429

(58) Field of Classification Search .................. 376/202, 376/156, 157, 158, 190, 340, 341, 342, 412, 376/418, 420, 428, 429

See application file for complete search history.

(56) References Cited

U.S. PATENT DOCUMENTS

| | | | |
|---|---|---|---|
| 3,594,275 A * | 7/1971 | Ransohoff | 376/158 |
| 3,940,318 A * | 2/1976 | Arino et al. | 205/48 |
| 3,998,691 A | 12/1976 | Shikata et al. | |
| 4,051,369 A * | 9/1977 | Takeshita | 378/58 |
| 4,196,047 A * | 4/1980 | Mitchem et al. | 376/202 |
| 4,284,472 A | 8/1981 | Pomares et al. | |
| 4,462,956 A | 7/1984 | Boiron et al. | |
| 4,475,948 A | 10/1984 | Cawley et al. | |
| 4,493,813 A | 1/1985 | Loriot et al. | |
| 4,532,102 A | 7/1985 | Cawley | |
| 4,597,936 A | 7/1986 | Kaae | |
| 4,617,985 A | 10/1986 | Triggs et al. | |
| 4,663,111 A | 5/1987 | Kim et al. | |
| 4,729,903 A | 3/1988 | McGovern et al. | |
| 4,782,231 A | 11/1988 | Svoboda et al. | |
| 4,859,431 A | 8/1989 | Ehrhardt | |

(Continued)

FOREIGN PATENT DOCUMENTS

EP 1667165 6/2006

(Continued)

OTHER PUBLICATIONS

European Search Report dated Oct. 15, 2009.

*Primary Examiner* — Rick Palabrica
*Assistant Examiner* — Erin M B Leach
(74) *Attorney, Agent, or Firm* — Harness, Dickey & Pierce

(57) ABSTRACT

Example embodiments and methods are directed to irradiation target retention devices that may be inserted into conventional nuclear fuel rods and assemblies. Example embodiment devices may hold several irradiation targets for irradiation during operation of a nuclear core containing the assemblies and fuel rods having example embodiment irradiation target retention devices. Irradiation targets may substantially convert to useful radioisotopes upon exposure to neutron flux in the operating nuclear core and be removed and harvested from fuel rods after operation.

17 Claims, 8 Drawing Sheets

U.S. PATENT DOCUMENTS

| | | | |
|---|---|---|---|
| 5,053,186 A | 10/1991 | Vanderheyden et al. | |
| 5,145,636 A | 9/1992 | Vanderhevden et al. | |
| 5,355,394 A | 10/1994 | Van Geel et al. | |
| 5,400,375 A | 3/1995 | Suzuki et al. | |
| 5,513,226 A | 4/1996 | Baxter et al. | |
| 5,596,611 A | 1/1997 | Ball | |
| 5,615,238 A | 3/1997 | Wiencek et al. | |
| 5,633,900 A | 5/1997 | Hassal | |
| 5,682,409 A | 10/1997 | Caine | |
| 5,758,254 A | 5/1998 | Kawamura et al. | |
| 5,867,546 A | 2/1999 | Hassal | |
| 5,871,708 A | 2/1999 | Park et al. | |
| 5,910,971 A | 6/1999 | Ponomarev-Stepnoy et al. | |
| 6,056,929 A | 5/2000 | Hassal | |
| 6,160,862 A | 12/2000 | Wiencek et al. | |
| 6,192,095 B1 | 2/2001 | Sekine et al. | |
| 6,233,299 B1 * | 5/2001 | Wakabayashi | 376/202 |
| 6,456,680 B1 | 9/2002 | Abalin et al. | |
| 6,678,344 B2 | 1/2004 | O'Leary et al. | |
| 6,751,280 B2 | 6/2004 | Mirzadeh et al. | |
| 6,804,319 B1 | 10/2004 | Mirzadeh et al. | |
| 6,895,064 B2 | 5/2005 | Ritter | |
| 6,896,716 B1 | 5/2005 | Jones, Jr. | |
| 7,157,061 B2 | 1/2007 | Meikrantz et al. | |
| 7,235,216 B2 | 6/2007 | Kiselev et al. | |
| 2002/0034275 A1 | 3/2002 | Abalin et al. | |
| 2002/0114420 A1 | 8/2002 | O'Leary et al. | |
| 2003/0012325 A1 | 1/2003 | Kernert et al. | |
| 2003/0016775 A1 | 1/2003 | Jamriska, Sr. et al. | |
| 2003/0103896 A1 | 6/2003 | Smith | |
| 2003/0179844 A1 | 9/2003 | Filippone | |
| 2004/0091421 A1 | 5/2004 | Aston et al. | |
| 2004/0105520 A1 | 6/2004 | Carter | |
| 2004/0196942 A1 | 10/2004 | Mirzadeh et al. | |
| 2004/0196943 A1 | 10/2004 | Di Caprio | |
| 2005/0105666 A1 | 5/2005 | Mirzadeh et al. | |
| 2005/0118098 A1 | 6/2005 | Vincent et al. | |
| 2006/0062342 A1 | 3/2006 | Gonzalez Lepera et al. | |
| 2006/0126774 A1 | 6/2006 | Kim et al. | |
| 2007/0133731 A1 | 6/2007 | Fawcett et al. | |
| 2007/0133734 A1 * | 6/2007 | Fawcett et al. | 376/438 |
| 2007/0297554 A1 | 12/2007 | Lavie et al. | |
| 2008/0031811 A1 | 2/2008 | Ryu et al. | |
| 2008/0076957 A1 | 3/2008 | Adelman | |

FOREIGN PATENT DOCUMENTS

| | | | |
|---|---|---|---|
| EP | 1667166 | | 6/2006 |
| FR | 2647945 | | 12/1990 |
| GB | 2144899 | | 3/1985 |
| JP | 2006162613 | * | 6/2006 |
| JP | 2006162613 A | * | 6/2006 |

* cited by examiner

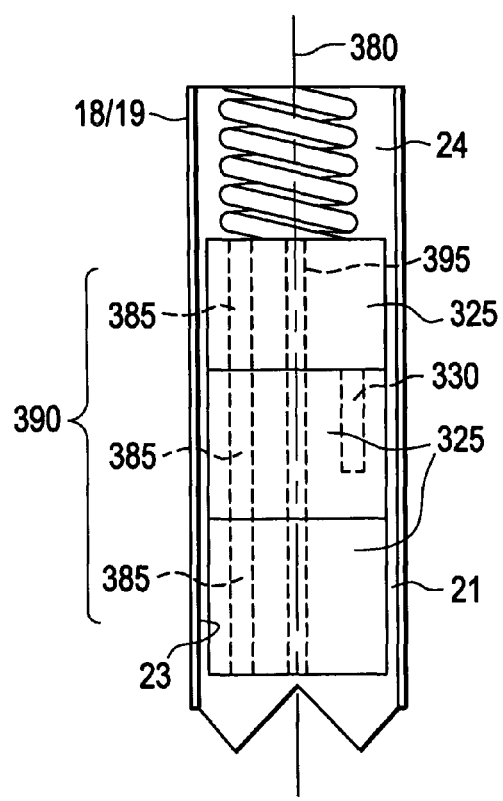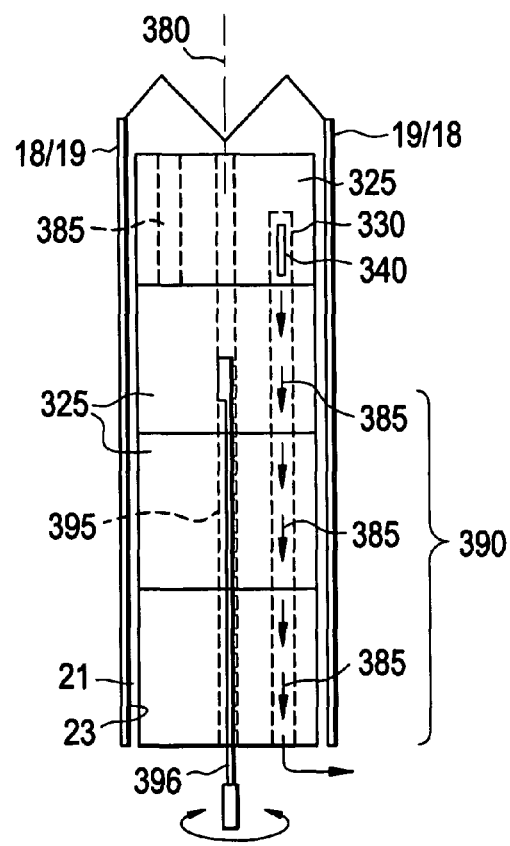

IRRADIATION TARGET RETENTION SYSTEMS, FUEL ASSEMBLIES HAVING THE SAME, AND METHODS OF USING THE SAME

BACKGROUND

1. Field

Example embodiments generally relate to fuel structures and radioisotopes produced therein in nuclear power plants.

2. Description of Related Art

Generally, nuclear power plants include a reactor core having fuel arranged therein to produce power by nuclear fission. A common design in U.S. nuclear power plants is to arrange fuel in a plurality of fuel rods bound together as a fuel assembly, or fuel assembly, placed within the reactor core. These fuel rods typically include several elements joining the fuel rods to assembly components at various axial locations throughout the assembly.

As shown in FIG. 1, a conventional fuel assembly 10 of a nuclear reactor, such as a BWR, may include an outer channel 12 surrounding an upper tie plate 14 and a lower tie plate 16. A plurality of full-length fuel rods 18 and/or part length fuel rods 19 may be arranged in a matrix within the fuel assembly 10 and pass through a plurality of spacers 20. Fuel rods 18 and 19 generally originate and terminate at upper and lower tie plates 14 and 16, continuously running the length of the fuel assembly 10, with the exception of part length rods 19, which all terminate at a lower vertical position from the full length rods 18.

As shown in FIG. 2, fuel elements 25 may be shaped in pellet-form and placed within the fuel rods 18 or 19. These fuel elements 25 may be "stacked" within the fuel rod continuously to provide fuel through the length of the fuel rod 18 or 19. The stacking of fuel elements 25 may permit expansion or other deformation of the fuel elements 25 during the operation cycle of the reactor core. Further, a gap 21 between the elements 25 and an inner wall 23 of the fuel rod 18 or 19 may accommodate gaseous fission products produced from the fuel elements 25 during operation of the reactor. Spring 24 at ends, typically at least an upper end, of the fuel element stack in the fuel rod may be present to further allow fission product accumulation and fuel element 25 deformation.

SUMMARY

Example embodiments and methods are directed to irradiation target retention devices and systems that may be inserted into conventional nuclear fuel rods and assemblies. Example embodiment devices may hold several irradiation targets for irradiation during operation of a nuclear core containing the assemblies and fuel rods having example embodiment irradiation target retention devices. Irradiation targets may substantially convert to useful radioisotopes upon exposure to neutron flux in the operating nuclear core and be removed and harvested from fuel rods 18/19 after operation.

An example embodiment irradiation target retention device may include one or more irradiation targets that may be inserted and held in retaining bores in the device during operation. Bores may be sealed by a cap or by other retention devices so as to provide multiple levels of containment to the irradiation targets and radioisotopes produced therein. In other example embodiments, irradiation targets may be removed from example embodiment retention devices by aligning exit spaces within the devices and removing irradiation targets therefrom.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the example embodiments herein.

FIG. 8 is an illustration of a stack of example embodiment irradiation target retention devices.

FIG. 9 is an illustration of a stack of example embodiment irradiation target retention devices positioned for target removal.

DETAILED DESCRIPTION

Detailed illustrative embodiments of example embodiments are disclosed herein. However, specific structural and functional details disclosed herein are merely representative for purposes of describing example embodiments. The example embodiments may, however, be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the language explicitly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 3:
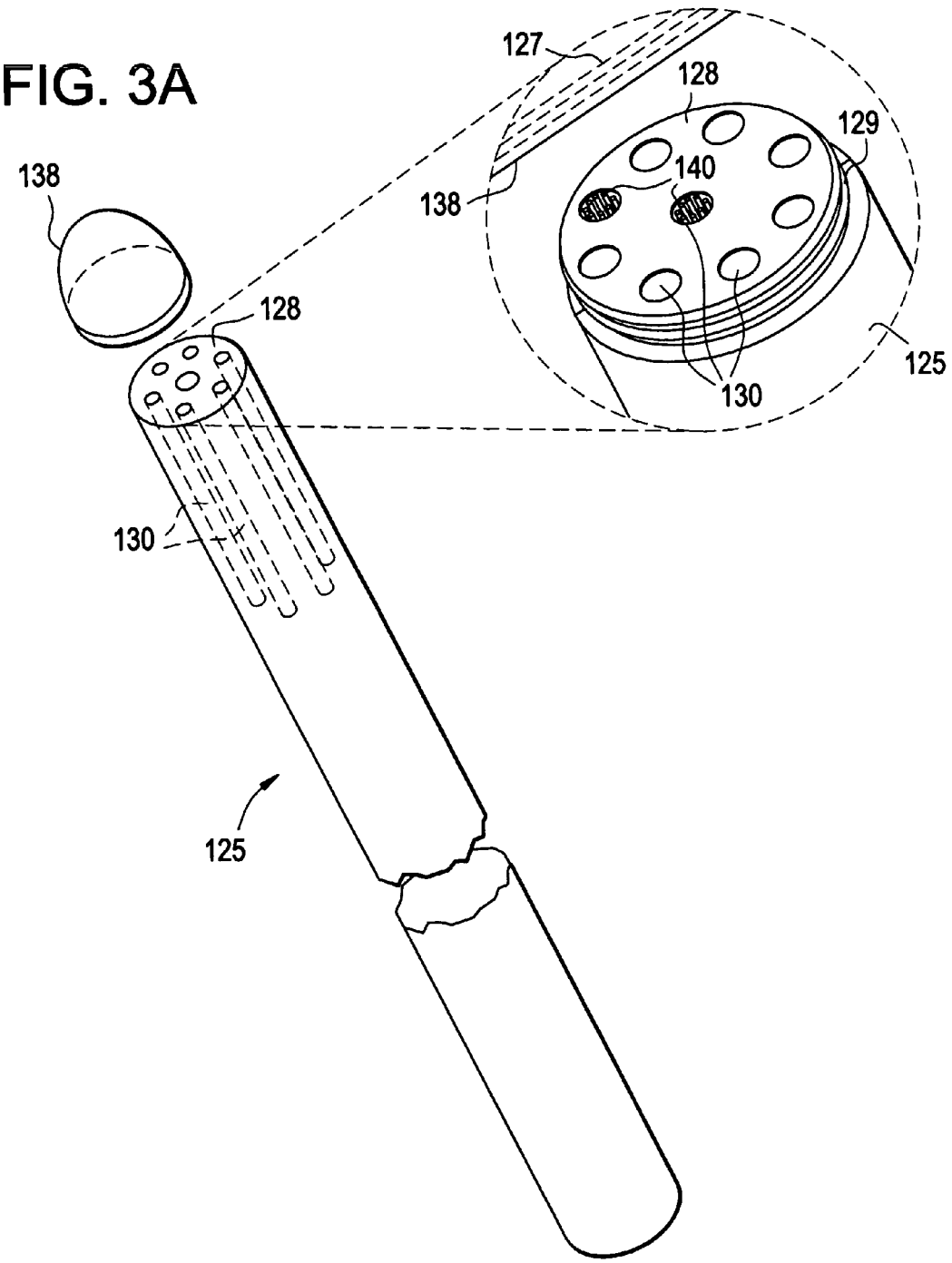
FIGS. 3A and 3B are an illustration and detail of an example embodiment irradiation target retention device.

FIG. 3A illustrates an example embodiment irradiation target retention device 125 that may makeup an irradiation target retention system. Irradiation target retention device 125 has dimensions that enable it to be inserted into conventional fuel rods (cladding tubes) used in conventional fuel assemblies. For example, irradiation target retention device 125 may have a maximum width of an inch or less and a maximum length of several feet. Although irradiation target retention device 125 is shown as cylindrical, a variety of properly-dimensioned shapes, including hexahedrons, cones, and/or prismatic shapes may be used for irradiation target retention device 125.

Example embodiment irradiation target retention device 125 includes one or more axial bores 130 that extend partially downward into device 125 in an axial direction from a top end/top face 128. Axial bores 130 may be arranged in any pattern and number, so long as the structural integrity of example embodiment irradiation target retention devices is preserved. Axial bores 130 may have a variety of dimensions and shapes. For example, axial bores 130 may taper with distance from top face 128 and/or may have rounded bottoms and edges.

Irradiation targets 140 may be inserted into one or more axial bores 130 in any desired number and/or pattern. Irradiation targets 140 may be in a variety of shapes and physical forms. For example, irradiation targets 140 may be small filings, rounded pellets, wires, liquids, and/or gasses. Irradiation targets 140 are dimensioned to fit within axial bores 130, and/or axial bores 130 are shaped and dimensioned to contain irradiation targets 140.

Irradiation targets 140 may be fabricated of a variety of materials that substantially convert into radioisotopes when exposed to a neutron flux encountered in example embodiment irradiation target retention devices 125. For example, irradiation targets 140 may include Iridium-191, which may convert to Iridium-192 when exposed to neutron flux encountered in an operating nuclear reactor, and/or Cobalt-59, which may convert to Cobalt-60 when exposed to neutron flux encountered in an operating nuclear reactor, etc. Irradiation targets 140 may further be sealed containers of a material designed to substantially maintain physical and neutronic properties when exposed to neutron flux within an operating reactor. The containers may contain a solid, liquid, and/or gaseous irradiation target and/or produced radioisotope so as to provide a third layer of containment (other containments discussed below) within irradiation targets 140.

A cap 138 may attach to top end/face 128 and seal irradiation targets 140 into axial bores 130. Cap 138 may attach to top end 128 in several known ways. For example, cap 138 may be directly welded to top face 128. Or, for example, as shown in FIG. 3B, cap 138 may screw onto top end 128 via threads 129 on example retention device 125 and cap 138. Or, for example, cap 138 may attach to an top end 128 via a lock-and-key mechanism on cap 138 and device 125. In any of these attachments, cap 138 may retain irradiation targets 140 within an axial bore 130 and allow easy removal of cap 138 for harvesting of irradiated irradiation targets 140. Cap 138 may further have a flat face that seats against each axial bore 130 on top face 128 so as to prevent irradiation targets 140 or solid, liquid, or gaseous radioisotopes produced by irradiation targets 140 from intermingling with other irradiation targets 140 and/or escaping from axial bores 130.

Example embodiment irradiation target retention device 125 is fabricated from a material designed to substantially retain its neutronic and physical properties when exposed to a neutron flux encountered in an operating nuclear reactor. Thus example embodiment irradiation target retention device 125 may not substantially interfere with neutron flux reaching irradiation targets 140 and may not chemically react with irradiation targets 140 or radioisotope produced therefrom. Example embodiment irradiation target retention device may be fabricated from, for example, a zirconium alloy, stainless steel, aluminum, a nickel alloy, Inconel, etc.

Figure 1:
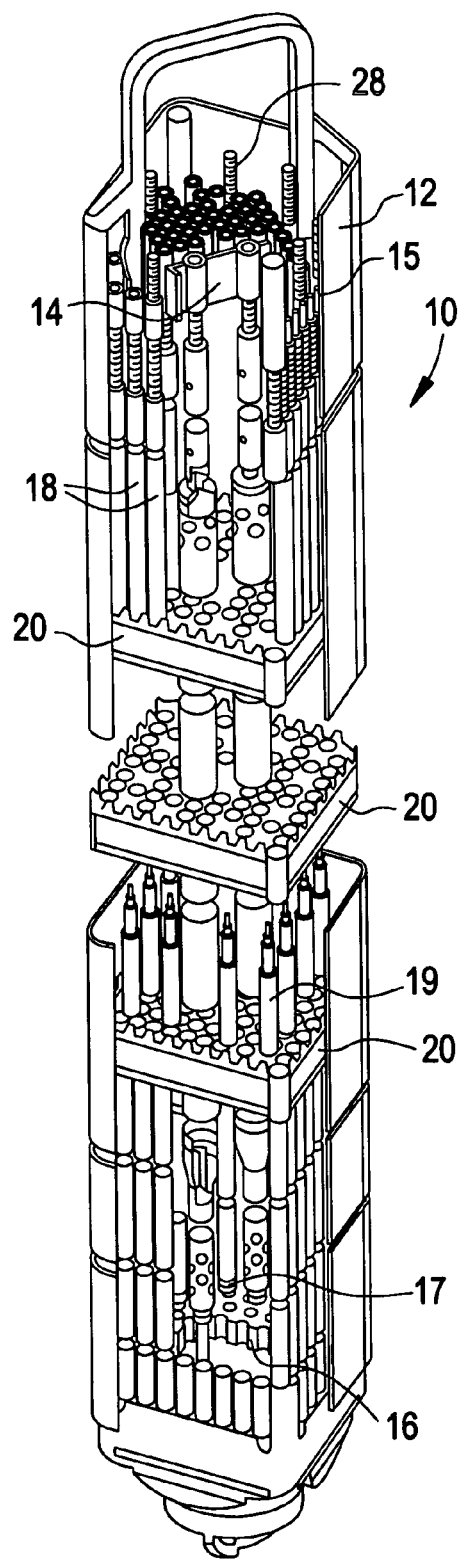
FIG. 1 is an illustration of a related art fuel assembly.
Figure 2:
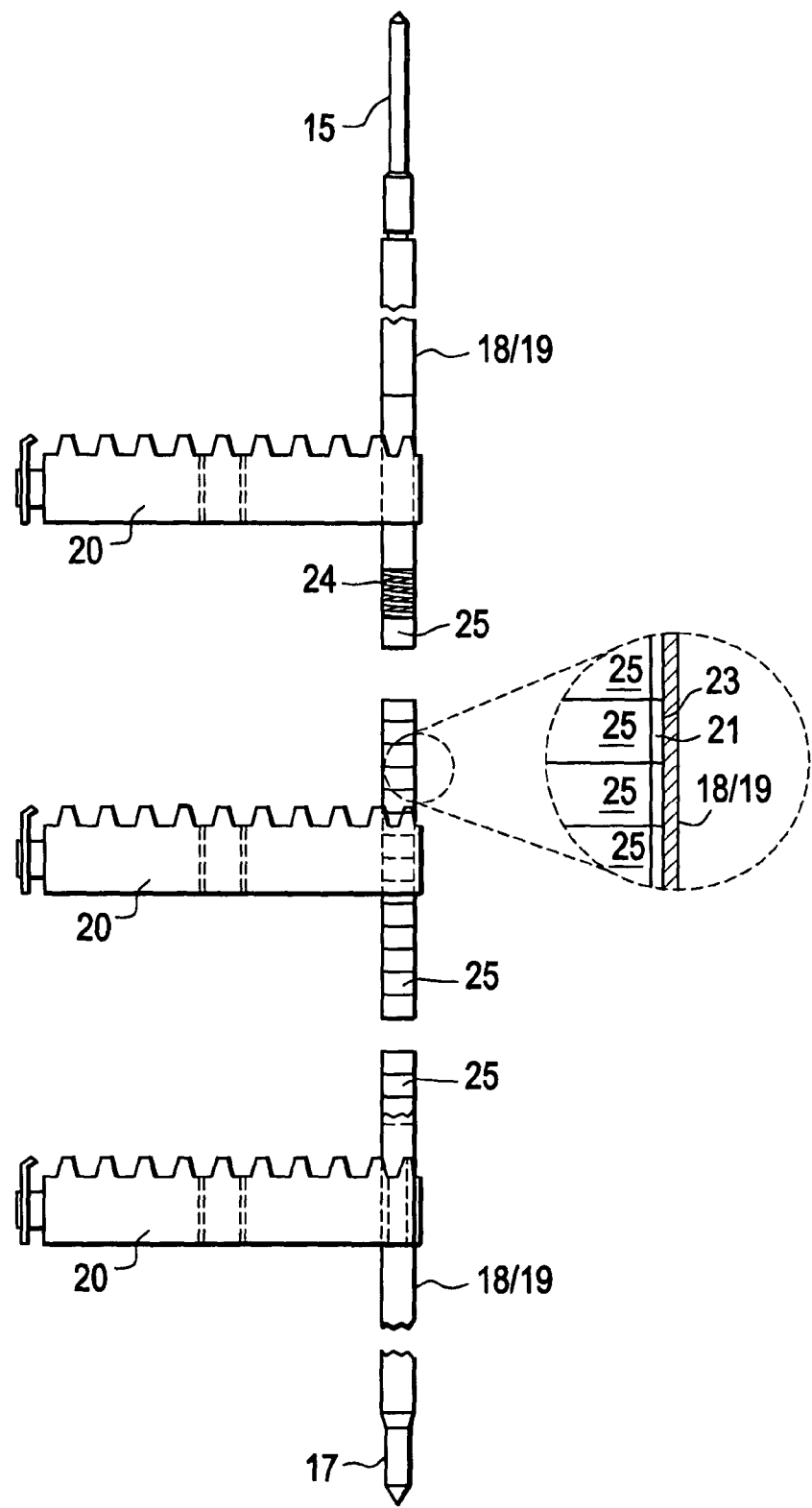
FIG. 2 is an illustration of a related art fuel rod having stacked fuel elements.
Figure 4:
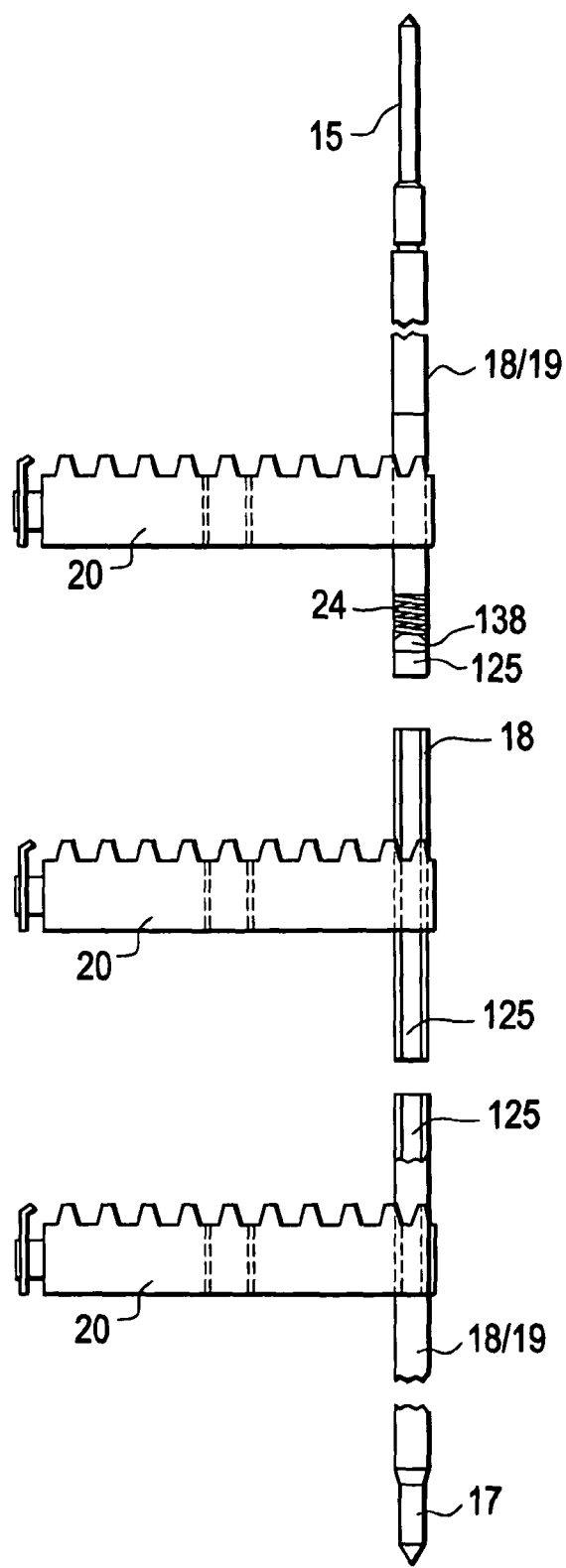
FIG. 4 is an illustration of an example embodiment fuel rod including an example embodiment irradiation target retention device.

As shown in FIG. 4, example embodiment irradiation retention device 125 may be inserted into conventional nuclear fuel rods 18 and/or 19 (FIGS. 1 & 2) in the same manner as conventional fuel pellets may be inserted into fuel rods 18/19 and sealed therein. Example embodiment irradiation retention device 125 may substantially fill the nuclear fuel rod 18/19, or alternatively, may not substantially fill nuclear fuel rod 18/19 and allow for empty space and/or nuclear fuel pellets to fill the remaining space of nuclear fuel rod 18/19. A spring 24 may be positioned axially with example embodiment irradiation retention device 125 so as to maintain a constant position of device 125 while permitting minor expansion and/or shifting due to variable conditions encountered in an operating nuclear reactor.

A nuclear reactor including a fuel assembly with a fuel rod having an example embodiment irradiation target retention device 125 may be operated at normal power operation such that example embodiment irradiation target retention device 125 and irradiation targets 140 therein are irradiated by neutron flux present in the operating reactor. Because flux levels in the reactor are known, and depth of bores 130 (shown in FIG. 3) and placement and composition of irradiation targets 140 therein may be known, it is possible for one skilled in the art to calculate the specific activity of radioisotopes produced from irradiation targets 140. Conversely, a person skilled in the art may calculate a bore 130 depth in order to affect optimal radioisotope production knowing operating flux levels and irradiation target 140 makeup.

Once irradiated and substantially converted into useful radioisotopes, irradiation targets 140 and example embodiment irradiation target retention device 125 may be removed from the nuclear reactor, for example, during reactor shut down. Example embodiment irradiation retention device 125 may be removed from irradiated fuel assemblies and fuel rods 18/19 and disassembled by removing cap 138 in order to harvest the irradiated irradiation targets 140 therein.

Rod 18/19 and example embodiment device 125 being capped and sealed provide at least a double containment for irradiation targets 140. This provides insurance against irradiation target escape in the event of fretting of cladding of fuel rod 18/19 containing example embodiment irradiation target retention device 125. Depending on placement of axial bores 140, additional containment may be provided by the radial thickness of example embodiment irradiation target retention devices 125.

Figure 5:
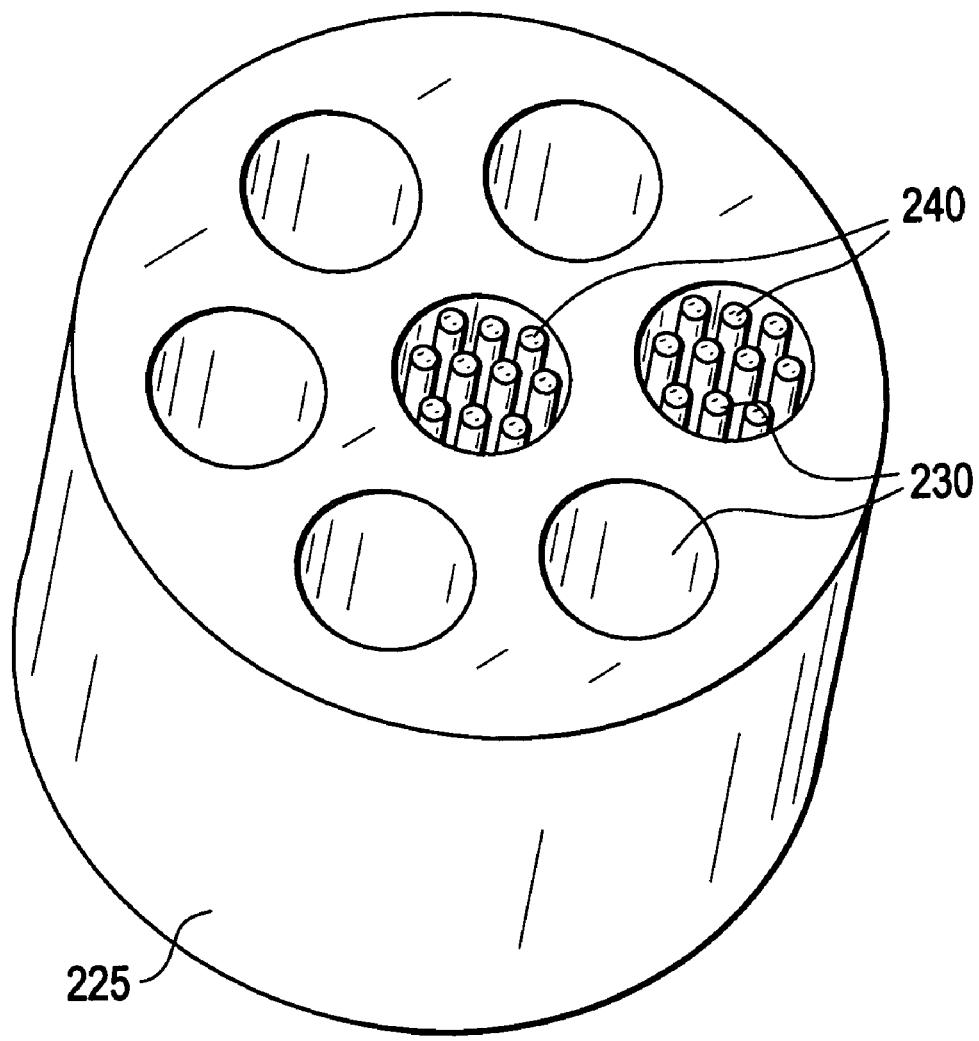
FIG. 5 is an illustration of another example embodiment irradiation target retention device.

As shown in FIG. 5, an alternative example embodiment irradiation target retention device 225 may be in a fuel element shape/cylindrical pellet-type configuration, although other shapes are useable for example embodiments. Example embodiment device 225 may be dimensioned so as to fit within a conventional nuclear fuel rod 18/19, had have a maximum length such that several example embodiment irradiation target retention devices 225 may fit within a fuel rod 18/19. For example, irradiation target retention device may have a length of a few centimeters or less.

Example embodiment irradiation target retention device 225 may otherwise share several characteristics with previously-discussed example embodiments, redundant portions of which are omitted. Example embodiment device 225 defines one or more bores 230 that extend into but not through example embodiment device 225. Bores 230 may be filled with a desired irradiation target 240 that substantially converts to a radioisotope when exposed to neutron flux passing through example embodiment device 225. Ingot-type example embodiment devices may further include a cap as described above with regard to previous example embodiments to contain irradiation targets 240 in bores 230 therein.

Figure 6:
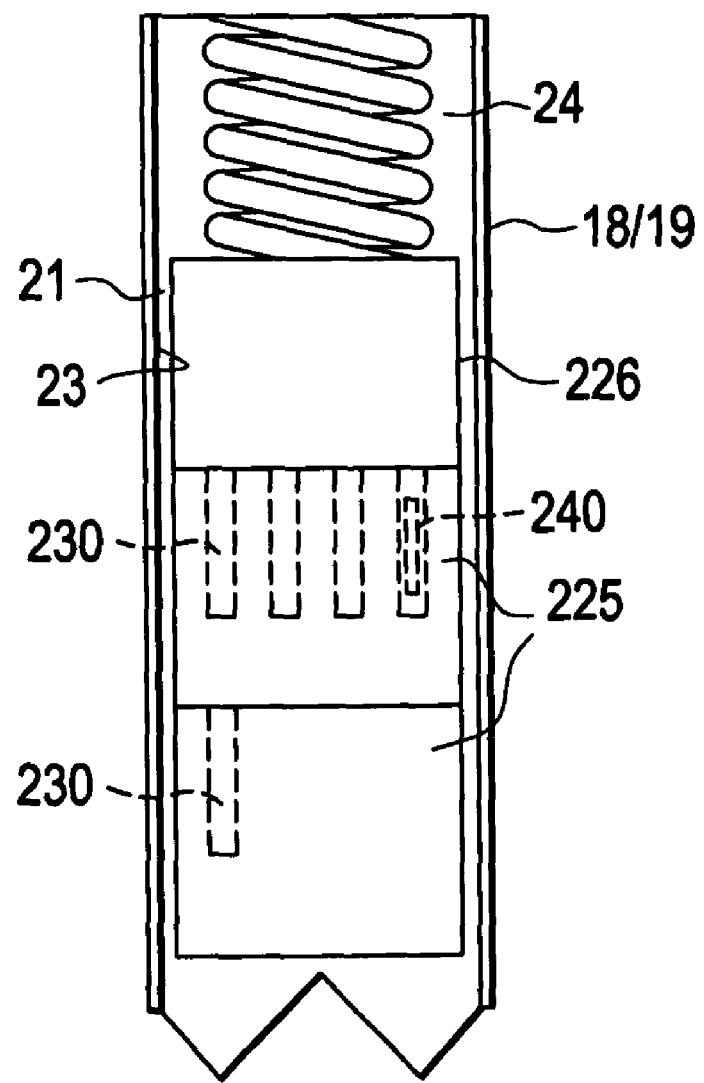
FIG. 6 is illustration of a stack of example embodiment irradiation target retention devices.

Alternatively, as shown in FIG. 6, instead of having a cap to retain irradiation targets 240 within bores 230, example embodiment irradiation target retention device 225 may be sealed and/or contained by an empty device 225 and/or a slug 226. Example target retention devices 225 may be tightly stacked with other example target retention devices 225 within a conventional nuclear fuel rod 18/19. A gap 21 may further be present between example devices 225/slug 226 and wall 23 of the fuel rod 18/19. A spring 24 or other holding device may supply resistive pressure against a stack of example embodiment devices 225 in order to hold them substantially flush against one another in the fuel rod 18/19. Because bores 230 may not pass entirely through example devices 225, the bottom surface of each device may be largely flat so as to facilitate a containing seal against another example device 225 stacked immediately below.

A slug 226 may be placed between the spring 24 or other preloading device and the stack of example embodiment irradiation retention devices 225 in order to provide the same sealing structure for the topmost device 225 in the stack. Slug 226 may be substantially similar to example embodiment devices 225, except it does not contain any irradiation targets so as to not leak targets onto spring 24 or any other tensioning device within rod 18/19.

Example embodiment irradiation target retention devices 225 may permit several different types and phases of irradiation targets 240 to be placed in each device 225 and each bore 230 thereof. Because several example devices 225 may be placed at precise axial levels within the fuel rod 18/19, it may be possible to provide a more exact amount/type of irradiation target 240 at a particular axial level within fuel rod 18/19. Because the axial flux profile may be known in the operating reactor, this may provide for more precise generation and measurement of useful radioisotopes in irradiation targets 240 placed within example embodiment irradiation target retention devices 225.

Figure 7:
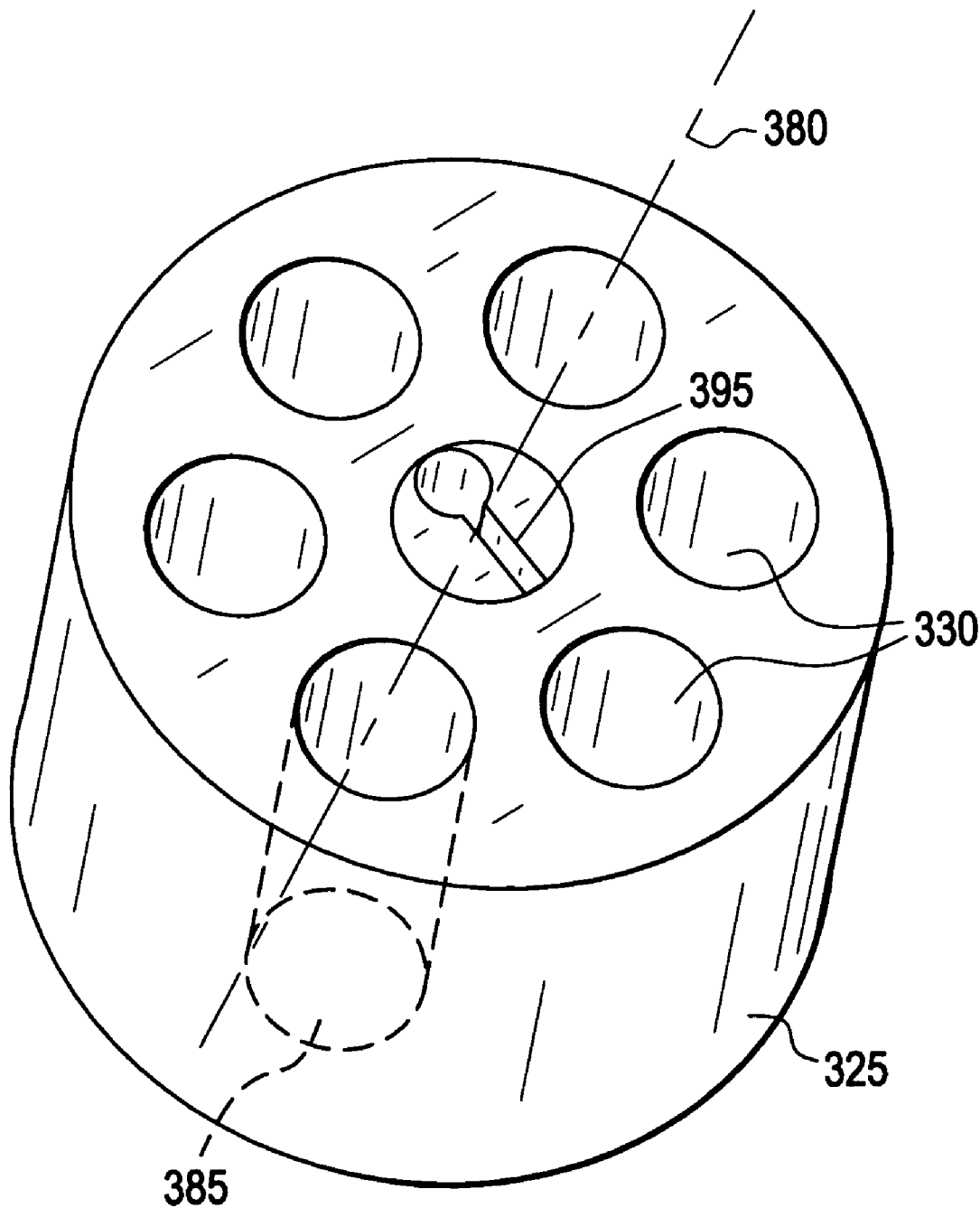
FIG. 7 is an illustration of another example embodiment irradiation target retention device.

As shown in FIG. 7, yet a further example embodiment irradiation target retention device 325 may be substantially similar to ingot-type example embodiment retention devices 225. However, example embodiment devices 325 may have one or more bores 330 that share a radial position about a central axis 380 of example embodiment devices 325. Example embodiment devices 325 further include a hole 385 in the shared radial position that passes completely through example embodiment irradiation target retention device 325, unlike bores 330. Irradiation targets may not be placed in hole 385.

Example embodiment irradiation target retention devices may further include a keyed slit 395 or other aperture positioned at central axis 380. Keyed slit 395 may be shaped to permit a correspondingly shaped shaft to pass through example embodiment device 395 and rotate example embodiment device 395 about central axis 380. The keyed slit 395 may be oriented in the same position with respect to the hole 385 in each example embodiment irradiation target retention devices 325.

As shown in FIG. 8, because bores 330 and hole 385 may share the same radial position about a central axis 380 in example embodiment irradiation target retention devices 325, if example devices 325 are stacked along axis 380 in fuel rod 18/19, all holes 385 may be aligned at a single angular position so as to form an exit shaft 390 through the stack of example embodiment devices 325. Further, because keyed slits 395 may also align and share a common orientation with holes 385 if example devices 325 are stacked, a tool having a keyed end corresponding to slit shape 395 may be passed into and through the stack of irradiation target retention devices 325.

As shown in FIG. 9, in order to harvest radioisotopes produced by example embodiment irradiation target retention devices 325 after irradiation thereof in an operating nuclear core, the stack of example embodiment devices 325 may be oriented with bores 330 facing downward such that irradiation targets 340 may fall out of bores 330 by gravitational action alone. Selected example embodiment devices 325 stacked within fuel rod 18/19 may then be rotated about central axis 380 until all holes 385, and thus exit shaft 390, align with a desired bore 330 of an unrotated device 325 within the stack. Irradiation targets 340 and radioisotopes present therein may fall from bore 330 through exit shaft 390 for harvesting.

Stacked example embodiment devices 325 may be rotated by a keyed tool 396 moved into keyed slit 395 at a desired axial distance. Thus the particular irradiation target retention device emptied through exit shaft 390 may be selected by the axial distance the keyed tool 396 is moved into keyed slits 395. Because all keyed slits 395 may be oriented similarly with respect to holes 385, exit shaft 390 may be rotated consistently to a bore 330 to be emptied. Further, a bottom-most (after turning the stack downward) example irradiation target retention device 325 may lack any irradiation targets 340 such that irradiation targets 340 will not fall from the bottom-most device 325 while emptying a stack of example embodiment devices 325.

Example embodiment irradiation target retention devices may be rotated by other mechanisms and lack a central keyed slit 395. For example, external sleeves may rotate individual retention devices 325 in a stack to desired angular positions to drain irradiated irradiation targets from exit shaft 385. Similarly, holes 385 need not contemporaneously align in a stack of example embodiment retention devices 325; an irradiation target may fall into an unaligned hole 385 that is later aligned with a lower hole 385, such that irradiation target 340 may fall in increments through a stack of example embodiment devices until harvested.

Although example embodiment retention devices may be inserted into BWR-type fuel rods and fuel assemblies in example embodiments, it is understood that other types of fuel and power plants may be useable with example embodiment retention devices. For example, PWR, CANDU, RBMK, ESBWR, etc. type reactors may include fuel rods that can accommodate example embodiment retention devices in order to irradiate irradiation targets therein.

Example embodiments thus being described, it will be appreciated by one skilled in the art that example embodiments may be varied through routine experimentation and without further inventive activity. For example, the word "assembly" is used throughout to denote a collection of fuel rods in example embodiments, but terms like "bundle" may also be used interchangeably, and example embodiments may be useable with fuel bundles lacking all components typically found in a finished fuel assembly. Or, for example, other fuel types, shapes, and configurations may be used in conjunction with example embodiment irradiation target systems. Variations are not to be regarded as departure from the spirit and scope of the exemplary embodiments, and all such modifications as would be obvious to one skilled in the art are intended to be included within the scope of the following claims.

What is claimed is:

1. An irradiation target retention system comprising:
   at least one irradiation target retention device,
      dimensioned and shaped to fit within a nuclear fuel rod such that a central axis of the at least one irradiation target retention device is parallel to a longitudinal axis of the fuel rod in which the at least one irradiation target retention device is dimensioned and shaped to fit,
      fabricated of a material configured to substantially maintain its physical and neutronic properties when exposed to the neutron flux in the operating nuclear reactor, and
      individually defining each of a plurality of bores, each of the bores being defined with a bottom in the irradiation target retention device in a direction of the central axis of the irradiation target retention device such that the bores do not pass entirely through the irradiation target retention device in the direction of the central axis of the irradiation target retention device, each of the bores being offset from the central axis of the irradiation target retention device; and
   at least one irradiation target contained in the irradiation target retention device by one of the bores, the irradiation target configured to substantially convert to a radioisotope when exposed to a neutron flux in an operating nuclear reactor.

2. The system of claim 1, wherein the at least one irradiation target retention device includes a cap configured to attach to an end of the irradiation target retention device having the at least one bore, the attaching of the cap and the device configured so as to retain the irradiation target within the at least one bore.

3. The system of claim 1, wherein the irradiation target is at least one of Iridium-191 and Cobalt-59.

4. The system of claim 1, a central axis for each of the bores is placed at an equal radial distance from the central axis of the irradiation target retention device.

5. The system of claim 4, wherein the at least one irradiation target retention device further defines at least one hole passing entirely through the irradiation target retention device, a central axis for the hole being located at the equal radial distance from the central axis of the irradiation target retention device.

6. The system of claim 5, wherein the at least one irradiation target retention device includes a keyed slit positioned about the central axis of the irradiation target retention device and passing through the irradiation target retention device, the keyed slit having a unique orientation with respect to the at least one hole.

7. The system of claim 1, wherein the irradiation target retention device is fabricated from at least one of a zirconium alloy, stainless steel, aluminum, nickel alloy, and Inconel.

8. A nuclear fuel assembly comprising:
   an upper tie plate;
   a lower tie plate; and
   a plurality of fuel rods extending between the upper tie plate and lower tie plate, at least one fuel rod including at least one irradiation target retention device including,
      a plurality of irradiation targets contained within a bore defined by the irradiation target retention device, the bore being offset from a central axis of the irradiation target retention device by a distance, the bore being defined with a bottom in the irradiation target retention device in a direction of the central axis of the irradiation target retention device such that the bore does not pass entirely through the irradiation target retention device in the direction of the central axis of the irradiation target retention device, the irradiation targets configured to substantially convert to a radioisotope when exposed to a neutron flux in an operating nuclear reactor,
      the irradiation target retention device including a hole passing entirely through the irradiation target retention device, a central axis of the hole being offset from the central axis of the irradiation target retention device by the distance,
      the irradiation target retention device dimensioned to fit within the at least one fuel rod, and
      the irradiation target retention device fabricated of a material configured to substantially maintain its physical and neutronic properties when exposed to the neutron flux in the operating nuclear reactor.

9. The nuclear fuel assembly of claim 8, wherein the irradiation targets include at least one of Iridium-191 and Cobalt-59.

10. The nuclear fuel assembly of claim 8, wherein the at least one fuel rod includes a plurality of irradiation target retention devices axially stacked within the at least one fuel rod.

11. The nuclear fuel assembly of claim 10, wherein the at least one fuel rod further includes a spring configured to compress the axially stacked plurality of irradiation targets within the at least one fuel rod with a force such that the irradiation target is sealed in the at least one bore.

12. The nuclear fuel assembly of claim 10, wherein the irradiation target retention device individually defines each of a plurality of bores and a central axis of each of the bores is placed at the equal radial distance from the central axis of the irradiation target retention device.

13. The nuclear fuel assembly of claim 8, wherein the irradiation target retention device further includes a keyed slit positioned about the central axis of the irradiation target retention device and passing through the irradiation target retention device, the keyed slit having a unique orientation with respect to the at least one hole.

14. The nuclear fuel assembly of claim 8, wherein the irradiation target retention device is fabricated from at least one of a zirconium alloy, stainless steel, aluminum, a nickel alloy, and Inconel.

15. The nuclear fuel assembly of claim 8, wherein the at least one irradiation target retention device includes a cap configured to attach to an end of the irradiation target retention device having the at least one bore, the attaching of the cap and the device configured so as to retain the irradiation target within the at least one bore.

16. The system of claim 1, wherein the material does not substantially interfere with the neutron flux.

17. The nuclear fuel assembly of claim 8, wherein the material does not substantially interfere with the neutron flux.

* * * * *

UNITED STATES PATENT AND TRADEMARK OFFICE
CERTIFICATE OF CORRECTION

| | | |
|---|---|---|
| PATENT NO. | : 8,050,377 B2 | Page 1 of 1 |
| APPLICATION NO. | : 12/149408 | |
| DATED | : November 1, 2011 | |
| INVENTOR(S) | : William Earl Russell, II et al. | |

It is certified that error appears in the above-identified patent and that said Letters Patent is hereby corrected as shown below:

On the Title Pg, Item (75) should read,

(75) Inventors: William Earl Russell, II, Wilmington, NC (US);

David Grey Smith, Leland, NC (US);

Michael S. DeFilippis, Wilmington, NC (US)

Signed and Sealed this
Tenth Day of January, 2012

David J. Kappos
*Director of the United States Patent and Trademark Office*